UNITED STATES PATENT OFFICE.

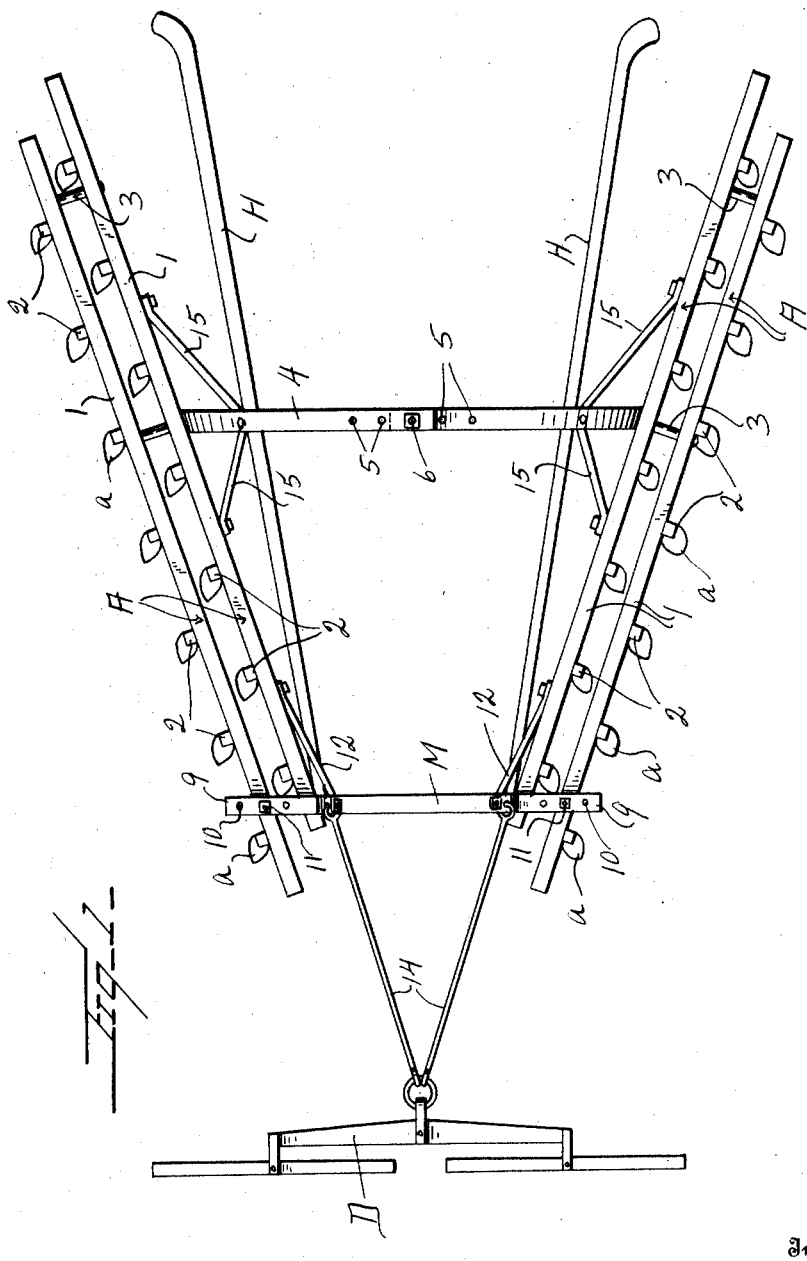

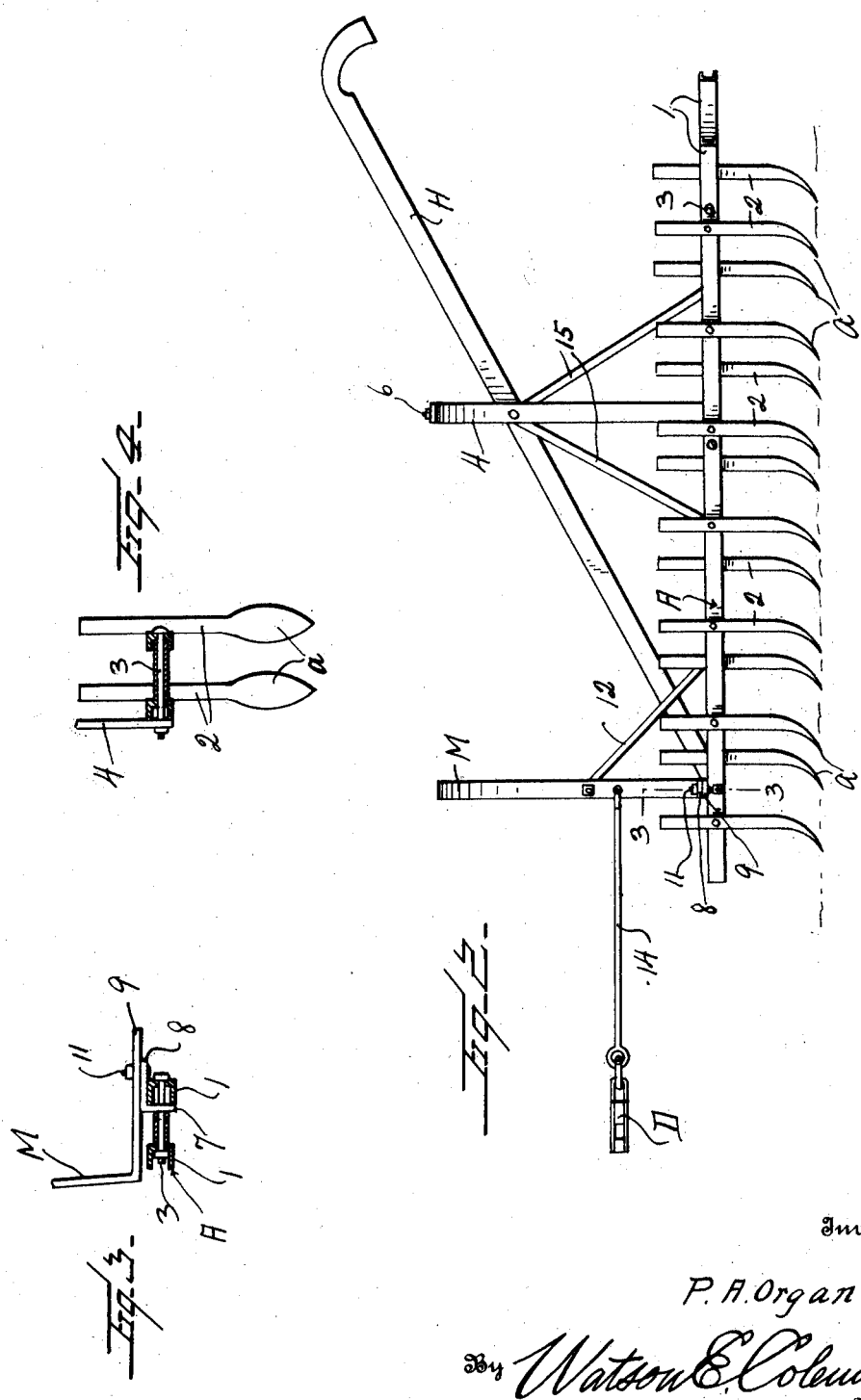

PHINIAS A. ORGAN, OF VINCENNES, INDIANA.

FARM IMPLEMENT.

1,401,434.   Specification of Letters Patent.   Patented Dec. 27, 1921.

Application filed March 22, 1920. Serial No. 367,805.

*To all whom it may concern:*

Be it known that I, PHINIAS A. ORGAN, a citizen of the United States, residing at Vincennes, in the county of Knox and State of Indiana, have invented certain new and useful Improvements in Farm Implements, of which the following is a specification, reference being had to the accompanying drawings.

This invention relates to certain improvements in farm implements, and it is an object of the invention to provide a novel and improved device of this general character which can be employed with convenience and facility as a weed destroyer and also as a surface mulcher.

It is also an object of the invention to provide a novel and improved device of this general character embodying teeth disposed in staggered or zigzag relation to effect a better penetration and at the same time to permit an effective shedding of the trash which may be collected thereby.

Another object of the invention is to provide a novel and improved implement of this general character which may be employed as a straddle row or with equal facility between rows, together with means whereby the same may be adjusted for close cultivation or wide cultivation as the occasions of practice may require.

The invention consists in the details of construction and in the combination and arrangement of the several parts of my improved implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a farm implement constructed in accordance with an embodiment of my invention;

Fig. 2 is a view in side elevation of the implement as herein embodied;

Fig. 3 is a fragmentary sectional view taken substantially on the line 3—3 of Fig. 2; and Fig. 4 is a fragmentary view partly in section and partly in elevation, illustrating in detail the connection between the elongated members comprised in each section of the implement.

As disclosed in the accompanying drawings, my improved implement comprises two sections, each indicated in their entirety as A. Each of said sections comprises two elongated members 1, U-shaped in cross section and secured to each of the members 1 in spaced relation longitudinally thereof are the ground working members or teeth 2, each of said teeth having its lower portion $a$ disposed on a forward curvature. The teeth 2 carried by one member 1 of each of the sections A are in staggered or zigzag relation with the teeth carried by the second member of the section. This zigzag or staggered relation of the teeth facilitates the action on the soil and facilitates the shedding of the trash which may be collected thereby. The curved lower or pointed extremities $a$ of the teeth also result in a suction action on the ground or soil during a working operation.

The members 1 of each of the sections A are maintained in desired spaced relation but preferably in close proximity one to the other through the medium of the connecting or tie bolts 3.

The inner member 1 of each of the sections A substantially midway thereof is provided with an upwardly disposed and inwardly directed curved member 4. The inner end portions of the members 4 overlap and said inner end portions are provided with the longitudinally spaced openings 5, an opening 5 in each of the members 4 being adapted to register with an opening 5 in the second member and through registering openings is disposed a bolt 6, or the like, whereby the sections A may be maintained in desired separated relation and more particularly the rear portions of said sections.

The forward or front connecting or tie bolt 3 of each of the sections A is also disposed through an angular lug 7 carried by an end portion of the plate 8, said lug being positioned between the members 1 of the section.

M denotes an arch member having its extremities provided with the oppositely directed and laterally disposed extensions or arms 9. Each of said extensions is provided with a series of longitudinally spaced openings 10 whereby said extension or arm may be adjustably secured through the instrumentality of a bolt 11, or the like, with a plate 8. By this means, a lateral adjustment of the forward end portion of each of the sections A with respect to the other may be effected as the occasions of practice may require. Interposed between the arch member M and the inner member 1 of each of the sections A is a brace rod 12, said rod being detachably held in applied position.

Also suitably engaged with the arch member M are the hitch rods 14 operatively engaged with a suitable draft rigging D, preferably a two horse rigging.

Secured to the forward end portion of the inner member of each of the sections A is an end portion of a handle member H. The handle member H extends rearwardly and upwardly on a predetermined incline and the rear portion thereof has coacting therewith the brace members 15, interposed between said handle member H and the inner rod 1. Said brace rods are preferably disposed on predetermined inclines and are reversely directed one with respect to the other.

With the assembly hereinbefore described, my improved implement operates as a straddle row cultivator and can be employed with convenience and facility in mulching the soil or for the purpose of weeding, and the relative adjustment of the sections A one with respect to the other permits the implement to be suitably arranged as the requirements of practice may facilitate.

It often occurs that it is of advantage and importance to employ my improved implement between rows and in which instance, the arch member M is removed and the forward extremities of the sections A suitably coupled. At the same time, the rear portions of the sections A are adjustable one toward the other in order to permit the same to properly pass between rows. When used between rows, the implement is adapted to be drawn by a single draft animal suitably hitched to the coupled forward end portions of the sections A.

From the foregoing description, it is thought to be obvious that an implement constructed in accordance with my invention is particularly well adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice except as hereinafter claimed.

I claim:—

An agricultural implement comprising two sections, each of said sections including an inner and outer elongated member connected to each other in spaced parallel relation, a rigid connecting member pivoted at its ends to one of the corresponding ends of said outer elongated members, and an adjustable connecting member permanently secured at its outer ends to the inner elongated members of said sections remote from the rigid connecting member, whereby said sections may be moved in convergent and divergent relation.

In testimony whereof I hereunto affix my signature.

PHINIAS A. ORGAN.